(12) United States Patent
Hess et al.

(10) Patent No.: US 12,338,947 B2
(45) Date of Patent: Jun. 24, 2025

(54) LUBRICATING SYSTEM

(71) Applicant: SKF LUBRICATION SYSTEMS GERMANY GMBH, Walldorf (DE)

(72) Inventors: Dieter Hess, Ludwigshafen (DE); Juergen Kreutzkaemper, Waibstadt-Daisbach (DE); Markus Mandera, Leimen (DE); Andreas Schoenfeld, Sankt Leon-Rot (DE); Stefan Schuermann, Walldorf (DE); Dennis Zahn, Karlsdorf-Neuthard (DE)

(73) Assignee: SKF LUBRICATION SYSTEMS GERMANY GMBH, Walldorf (DE)

( * ) Notice: Subject to any disclaimer, the term of this patent is extended or adjusted under 35 U.S.C. 154(b) by 0 days.

(21) Appl. No.: 18/287,095

(22) PCT Filed: Apr. 25, 2022

(86) PCT No.: PCT/EP2022/060844
§ 371 (c)(1),
(2) Date: Oct. 16, 2023

(87) PCT Pub. No.: WO2022/233622
PCT Pub. Date: Nov. 10, 2022

(65) Prior Publication Data
US 2024/0200721 A1    Jun. 20, 2024

(30) Foreign Application Priority Data
May 6, 2021    (DE) .......................... 102021204619.3

(51) Int. Cl.
*F16N 25/00* (2006.01)
*F16N 7/38* (2006.01)
*F16N 29/00* (2006.01)

(52) U.S. Cl.
CPC ............. *F16N 25/00* (2013.01); *F16N 7/385* (2013.01); *F16N 29/00* (2013.01); *F16N 2250/04* (2013.01)

(58) Field of Classification Search
CPC .......... F16N 25/00; F16N 7/385; F16N 29/00; F16N 2250/04
See application file for complete search history.

(56) References Cited

U.S. PATENT DOCUMENTS 4,044,924 A * 8/1977 Saretzky ................. F16N 13/22
                                                184/7.4
4,390,083 A * 6/1983 Saretzky ................. F16N 7/385
                                                184/7.4

(Continued)

FOREIGN PATENT DOCUMENTS

DE    102004032453 A1    1/2006
JP    H0681997 A          3/1994

OTHER PUBLICATIONS

English translation of the Written Opinion of the International Searching Authority in parent application No. PCT/EP2022/060844.

(Continued)

*Primary Examiner* — Michael A Riegelman
(74) *Attorney, Agent, or Firm* — J-TEK LAW PLLC; Scott T. Wakeman; Mark A. Ussai

(57) ABSTRACT

A lubrication system includes a progressive distributor that is configured to dispense lubricant to a consumer. The lubrication system also includes a control device and at least one sensor that is configured to determine at least one lubricant pressure inside the lubrication system. The control device is configured to receive measured values from the at least one sensor and to recognize a lubrication cycle based on the measured values and also to determine an average pressure of the lubrication cycle, to perform a comparison of (Continued)

the average pressure and at least one normal pressure of the lubrication system, and to determine a state of the lubrication system based on a result of the comparison.

11 Claims, 4 Drawing Sheets

(56) References Cited

U.S. PATENT DOCUMENTS

| | | | | |
|---|---|---|---|---|
| 4,393,958 A * | 7/1983 | Saretzky | ............... | F16N 25/00 184/7.4 |
| 4,397,376 A * | 8/1983 | Saretzky | ............... | F16N 25/02 184/7.4 |
| 4,502,567 A * | 3/1985 | Kaercher | ............... | F16N 25/02 184/7.4 |
| 4,537,284 A * | 8/1985 | Breisinger | ............... | F16N 25/02 184/29 |
| 4,609,073 A * | 9/1986 | Knaebel | ............... | F16N 25/02 417/349 |
| 4,712,649 A * | 12/1987 | Saam | ............... | F16N 25/02 137/119.06 |
| 4,895,192 A * | 1/1990 | Mortenson | ............... | F01M 11/04 137/625.68 |
| 4,921,072 A * | 5/1990 | Divisi | ............... | F16N 25/02 137/119.06 |
| 4,972,925 A * | 11/1990 | Saretzky | ............... | F16N 25/02 184/7.4 |
| 5,209,324 A * | 5/1993 | Hogbacka | ............... | F28G 15/00 184/7.4 |
| 5,311,968 A * | 5/1994 | Pingel | ............... | F16N 25/00 184/29 |
| 5,628,384 A * | 5/1997 | Mismas | ............... | F16N 25/02 184/6.24 |
| 5,730,174 A * | 3/1998 | Mismas | ............... | F15B 13/0835 137/271 |
| 5,799,751 A * | 9/1998 | Winkler | ............... | B23Q 11/123 184/105.3 |
| 2005/0003036 A1 * | 1/2005 | Nishimura | ............... | B29C 45/83 425/149 |
| 2005/0163626 A1 * | 7/2005 | Paluncic | ............... | F16N 25/02 417/244 |
| 2007/0187181 A1 * | 8/2007 | Brendel | ............... | F16N 13/06 184/6.28 |
| 2008/0142304 A1 * | 6/2008 | Schutz | ............... | F16N 7/38 184/7.4 |
| 2010/0206667 A1 * | 8/2010 | Paluncic | ............... | F16N 25/02 184/7.4 |
| 2012/0145482 A1 * | 6/2012 | Ifield | ............... | F16N 7/385 184/6 |
| 2012/0273305 A1 * | 11/2012 | Brendel | ............... | F16N 29/04 184/7.4 |
| 2013/0015019 A1 * | 1/2013 | Kuvaja | ............... | F16N 29/02 184/26 |
| 2013/0118835 A1 * | 5/2013 | Schmitt | ............... | F16N 25/02 184/6 |
| 2014/0090929 A1 * | 4/2014 | Powell | ............... | F16N 29/04 184/6 |
| 2014/0124073 A1 * | 5/2014 | Divisi | ............... | F16K 11/10 137/625.48 |
| 2016/0033079 A1 * | 2/2016 | Guenther | ............... | F16N 29/04 184/7.4 |
| 2017/0261009 A1 * | 9/2017 | Paulessen | ............... | A01B 76/00 |
| 2018/0202603 A1 * | 7/2018 | Guenther | ............... | F16N 7/385 |
| 2019/0040996 A1 * | 2/2019 | Kreutzkaemper | ............... | H01F 7/06 |
| 2019/0040997 A1 * | 2/2019 | Kreutzkaemper | ............... | H02N 2/18 |
| 2020/0318658 A1 * | 10/2020 | Hess | ............... | F04B 9/105 |
| 2021/0271237 A1 * | 9/2021 | Gebauer | ............... | G05B 23/0264 |
| 2021/0310612 A1 * | 10/2021 | Kreutzkaemper | ............... | F16N 7/00 |
| 2021/0317949 A1 * | 10/2021 | Hess | ............... | F16N 27/00 |
| 2022/0107053 A1 * | 4/2022 | Hess | ............... | F16N 25/02 |
| 2024/0133517 A1 * | 4/2024 | Kreutzkamper et al. | ............... | F16N 25/02 |
| 2024/0200719 A1 * | 6/2024 | Kreutzkaemper | ............... | F16N 29/00 |
| 2024/0200721 A1 * | 6/2024 | Hess | ............... | F16N 7/385 |

OTHER PUBLICATIONS

English translation the International Search Report dispatched Nov. 10, 2022 for parent application No. PCT/EP2022/060844.

* cited by examiner

LUBRICATING SYSTEM

CROSS-REFERENCE

This application is the U.S. National Stage of International Application No. PCT/EP2022/060844 filed on Apr. 25, 2022, which claims priority to German patent application no. 10 2021 204 619.3 filed on May 6, 2021.

TECHNOLOGICAL FIELD

The present disclosure is directed to a lubrication system including a progressive distributor and to a control device for such a lubrication system.

BACKGROUND

In lubrication systems, for example, central lubrication systems, that include a progressive distributor, different malfunctions or even complete failures can occur. Such a lubricant system can include a main progressive distributor to which a plurality of further distributors or pistons are connected, which in turn transfer lubricant to connected consumers. Here a complete blockage of a lubricant line or piston, a line break, or even only a kink in a line, etc. can occur. Up to now, malfunctions of the pistons can be detected by a piston detector that monitors the movement of a piston and detects faults that cause the piston to no longer move. However, only complete blockages or a failure of the lubricant supply are thereby detected. Line breaks in the downstream part of the distributor system, partial blockages, or impending blockages cannot be detected. Furthermore, a complete blockage is detected in a delayed manner, since even in the event of a complete blockage the lines of the system can buffer lubricant, so that non-blocked distributers still distribute lubricant for a certain time without a fault being detected.

In order to be able to detect further malfunctions, further sensors are required that must be disposed at many different points of the lubrication system in order to allow a comprehensive monitoring. For example, a line break monitor, a flow sensor, and/or pressure sensors can be provided at each outlet of the progressive distributor.

SUMMARY

It is therefore the object of the present invention an aspect of the present disclosure to provide a lubrication system including a progressive distributor in order to be able to monitor a state of the lubrication system in a simple manner, even with few sensors The lubrication system includes a progressive distributor in order to dispense lubricant to one or more consumers. Progressive distributors are configured to meter and to distribute lubricant continuously to different lubrication points or consumers. From the progressive distributor, direct lines can lead to the corresponding lubrication points.

The progressive distributor furthermore includes a housing block, which includes a lubricant inlet bore via which lubricant is introducible into the progressive distributor, and a plurality of lubricant outlet bores via which a metered quantity of lubricant is dispensable to a consumer connected to the respective lubricant outlet bore. Furthermore, for the dispensing of the metered quantity of lubricant a plurality of metering pistons are provided in the housing, which metering pistons are received in associated piston bores, wherein two lubricant outlet bores are associated with each piston bore, and the metering piston is displaceable in the piston bore and is configured to alternatively release the one or the other lubricant outlet bore in order to dispense the metered quantity of lubricant to the consumer via the lubricant outlet bore. Here the piston bores are in fluidic connection with the lubricant inlet bore, and the piston bores are mutually fluidically connected to one another via connecting bores in order to transfer lubricant to the other piston bores.

In order to ensure that the progressive distributor as well as the lubricant system work correctly as a whole, the progressive distributor can include at least one sensor that is configured to determine at least one lubricant pressure inside the lubrication system. This lubricant pressure, and possibly further measured values, are transmitted from the sensor to a control device that is part of the lubrication system. The sensor and the control device can communicate with each other wirelessly or in a wired manner.

In order to now detect a correct operation or fault in the lubrication system, the control device is configured, based on the measured values, to recognize lubrication cycles and to determine the average pressure of a lubrication cycle. The control device can in particular be configured to continuously detect the lubrication cycles and to determine such an average pressure for each lubrication cycle. The control device can subsequently compare the determined average pressure of a lubrication cycle to a normal pressure of the lubrication system. Based on the comparison result, the control device can determine the state of the lubrication system.

Thus not only is the pressure of the lubrication system generally determined and a falling or rising pressure recognized, but an average pressure over a lubrication cycle is determined, and this average pressure is compared with a normal pressure of the lubrication system that corresponds to a normal operation of the lubrication system. By the comparing of a current average pressure to a normal pressure of the lubrication system, it is possible to detect proper operation or faulty states of the lubrication system.

According to one embodiment, the control device can in particular receive a pressure and a temperature of the lubrication system from the sensor. A plurality of sensors can also be present, for example, a temperature sensor and a pressure sensor.

A single pressure sensor is preferably used that is configured to determine a lubricant pressure, wherein the pressure sensor is disposed upstream from the metering pistons with respect to a lubricant flow direction. That is, the pressure sensor determines the lubricant pressure before the lubricant reaches the first metering piston.

The inventors have surprisingly found that a pressure sensor that is disposed upstream from the metering pistons in a lubricant flow direction allows a more precise state detection than a piston detector, a flow sensor, and/or a line break monitor alone, and additionally is more cost-effective, in particular more cost-effective than a combination of these three types of monitoring. Since the pressure sensor is installed near the inlet of the progressive distributor of the lubrication system, the pressure sensor detects the pressure in the lubricant line at this point. Due to the functioning of a progressive distributor, the pressure level at the inlet of the distributor is approximately the pressure level of the respective currently controlled lubricant outlet, which is why it is sufficient to detect only the pressure at the inlet of the distributor.

Alternatively a plurality of pressure sensors can be used that are disposed at different points in the lubrication system or the progressive distributor, for example, both at the inlet and at each outlet of the progressive distributor. Due to such an arrangement it is possible to obtain much pressure information at a plurality of points of the lubrication system, whereby a particularly precise determining of a position of a fault is possible. In this case the control device can determine the average pressure of the entire lubrication system, but also the average pressure at each outlet of the progressive distributor. This makes possible a comprehensive evaluation of the entire lubrication system.

According to a further embodiment, the control device is configured to recognize a lubrication cycle based on pressure fluctuations of the lubrication system. Due to the operating principle of a progressive distributor, the pressure in the lubrication system fluctuates during a lubrication cycle. These pressure fluctuations are more or less identical for each lubrication cycle, so that a start and an end of a lubrication cycle can be detected based on these pressure fluctuations.

The pressure fluctuations depend on the individual construction of a lubrication system, i.e., the number of components, the length of the lines, the arrangement of the components, the duration of the lubrication cycles, etc. However, the pressure fluctuations per lubrication cycle of a lubrication system are identical for each lubrication cycle, so that with deviations therefrom, malfunctions of the lubrication system can be detected.

In addition to the average pressure of a lubrication cycle, the control device can furthermore be configured to determine a maximum pressure of a lubrication cycle, a minimum pressure of a lubrication cycle, and a temperature of the lubrication system. In particular, the sensor can continuously transfer measured values to the control device, wherein the control device determines from these measured values or pressure values a maximum pressure and a minimum pressure. The average pressure can be determined by averaging of all measured pressure values.

In order to carry out a precise determination of the state of the lubrication system, according to a further embodiment the control device is configured to assign the average pressure to a temperature window based on the temperature of the lubrication system. Lubricant and thus also the pressure in the lubrication system, depend heavily on the temperature. In order to therefore be able to compare the average pressure to a normal pressure that is valid at the current temperature, the current temperature of the lubrication system must therefore first be determined and associated with a temperature window. The size of the temperature window can be chosen arbitrarily, for example, temperature windows can be defined in an interval of 5 degrees. After selection of the corresponding temperature window, the control device can retrieve from a database the normal pressure of the lubrication system that is associated with this temperature window. The database can be, for example, part of the control device, or can be disposed removed therefrom, for example, on a server. The normal pressure values of the lubrication system for a plurality of temperature windows are preferably stored in the database.

If no normal pressure is yet available in the database for a temperature window, the control device can save the currently determined average pressure as normal pressure for the temperature window. In this way it is possible to expand the database when no data are available for a current temperature window. It is assumed here that the lubrication system initially functions in a fault-free manner so that at least at the start of the operating of the lubrication system, if insufficient data are stored in the database, such an average pressure can be viewed as normal pressure for the temperature window.

Furthermore, the control device can be configured to continuously expand the database. This means that when a fault-free operation of the lubrication system has been recognized, the control device can use the current average pressure of a temperature window to update in the database the normal pressure of the lubrication system for this temperature window. Here the normal pressure of the lubrication system is defined as an average of pressure values in a temperature window, wherein these pressure values are to be associated with a fault-free operation of the lubrication system. Thus if a fault-free operation is recognized, the current average pressure is added to the already existing average pressure values of this temperature window, and the average value of all average pressure values is stored as updated normal pressure of the lubrication system for the current temperature window. In this way the database is continuously updated so that a type of self-learning system is implemented.

The state of the lubrication system determined by the control device can indicate a fault-free operation, a malfunction of the lubrication system, or no function of the lubrication system. "Fault-free operation" is understood to mean operation of the lubrication system wherein the lubrication system works properly without faults or malfunctions.

"No function" of the lubrication system means that no function of the lubrication system is detected at all. This can be the case when there is a complete failure of the lubrication system, or when the sensors have completely failed.

A malfunction of the lubricant system can be a blockage of a lubricant line or of a piston, a kink of a lubricant line, a break of a lubricant line, or another malfunction of the lubrication system. In particular, these can be malfunctions wherein a certain amount of lubricant is still pumped.

A blockage of a lubricant line can be detected, for example, when three successive average pressure values are higher by a factor k than the temperature-dependent normal pressure, and the values continuously increase. The values need not increase linearly, since in the event of a blockage the development of the pressure corresponds to a limited growth. Alternatively, a blockage can be assumed when a value of an average pressure is at least 200% above the normal pressure. A "blockage" is understood to mean that a lubricant line is blocked, for example, by foreign bodies, grease deposits, or the like. In particular, this blockage can build up continuously, for example, by continuously reducing the through-flow through the lubricant line.

If at least three successive average pressure values higher by a factor k than the normal temperature-dependent normal pressure are detected, wherein the values increase non-continuously, this is defined as a kink in a line.

If at least three successive values of the average pressure lower by a factor k than the temperature-dependent normal pressure are detected, wherein the values in particular decrease non-continuously, a line break is assumed. Such a line break leads to a leakage of lubricant, whereby the pressure in the lubrication system drops.

Continuously falling pressure values could be an indication of an increasing leakage, for example, a hole in a line that is getting increasingly larger.

The factor k, as is used here, can be determined based on tests. It can preferably be adaptable, and can be individually adapted for each system as required (e.g., in the case of many false fault notifications).

If other deviations from the temperature-dependent normal pressure are present, under certain circumstances indeed it cannot be determined which type of faults are present, but it is recognized that a fault of the lubrication system is present.

In a fault-free operation, a periodic change between the lubrication cycles and the pause times is detected, wherein no relevant deviations are present of the values of the average pressure from the temperature-dependent normal pressure. If such a fault-free operation is detected, the current average pressure is used to update the normal pressure in the database, as is already explained above.

The recognized state of the lubrication system can be output via a visual indicator. In the simplest case an indicator is effected by a colored indicator, for example, using LEDs. For example, a traffic-light system can be used including an indicator in red, yellow, or green, in order to indicate no function, a malfunction, or a fault-free operation. In addition, further information can also be indicated in a display that specifies more precise information about the current state or a malfunction of the lubrication system. The control device can also output the corresponding state of the lubrication system to a mobile device, for example, a tablet, laptop, mobile phone, or the like, and display it there.

The measured values of the at least one sensor can be present as analog signals. In particular, the measured values can be present as a time-triggered signal in order to recognize a course of the pressure over time. This is necessary in order on the one hand to detect the lubrication cycles, and on the other hand to be able to detect and process the pressure in the course of the lubrication cycle.

The received measured values can be stored in the control device, for example, as an array, wherein a plurality of values, in particular pressure and temperature, are contained per time.

Depending on the available temporal resolution, i.e., depending on the number of values per lubrication cycle, the control device may only carry out an evaluation of the state of the lubrication system in no function, malfunction, or fault-free operation. If more precise or more values per lubrication cycle are present, a more precise decision can be carried out about the current state, as explained above. It is also possible that when a malfunction is recognized without further determination, the control device issues a corresponding signal to the sensors in order to obtain a temporally higher-resolution signal for the next lubrication cycle. This means that the measured values are initially obtained from the at least one sensor with a low sample rate, and when a fault occurs the sensor is switched to a higher sample rate in order to be able in the next step or during the analysis of the next lubrication cycle, to provide more precise information. In addition to the measured values pressure and temperature, further measured values are also conceivable, for example, vibration of the distributor, speed of the piston movement (e.g., via ultrasound or inductivity), flow quantities, etc.

A further aspect of the present invention relates to a method for determining the state of a lubrication system including a progressive distributor that is configured to dispense lubricant to a consumer. The method furthermore includes: determining of at least one lubricant pressure inside the lubrication system by a sensor, receiving of the measured values from the sensor by a control device, detecting of lubrication cycles based on the measured values, determining of the average pressure of a lubrication cycle, comparing of the determined average pressure to a normal pressure of the lubrication system, and determining of the state of the lubrication system based on the comparison result.

A still further aspect of the present invention relates to a computer program product that includes a computer program code that is configured to trigger a control unit, for example, a computer, and/or the above-described control device to carry out the above-described steps. The database can also be implemented by the computer program.

The computer program product can be provided as a storage device, such as, for example, a storage card, USB stick, CD-ROM, DVD, and/or can be a file that can be downloaded from a server, in particular a remote server, in a network. The network can be a wireless communication network for the transmission of the file including the computer program product.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
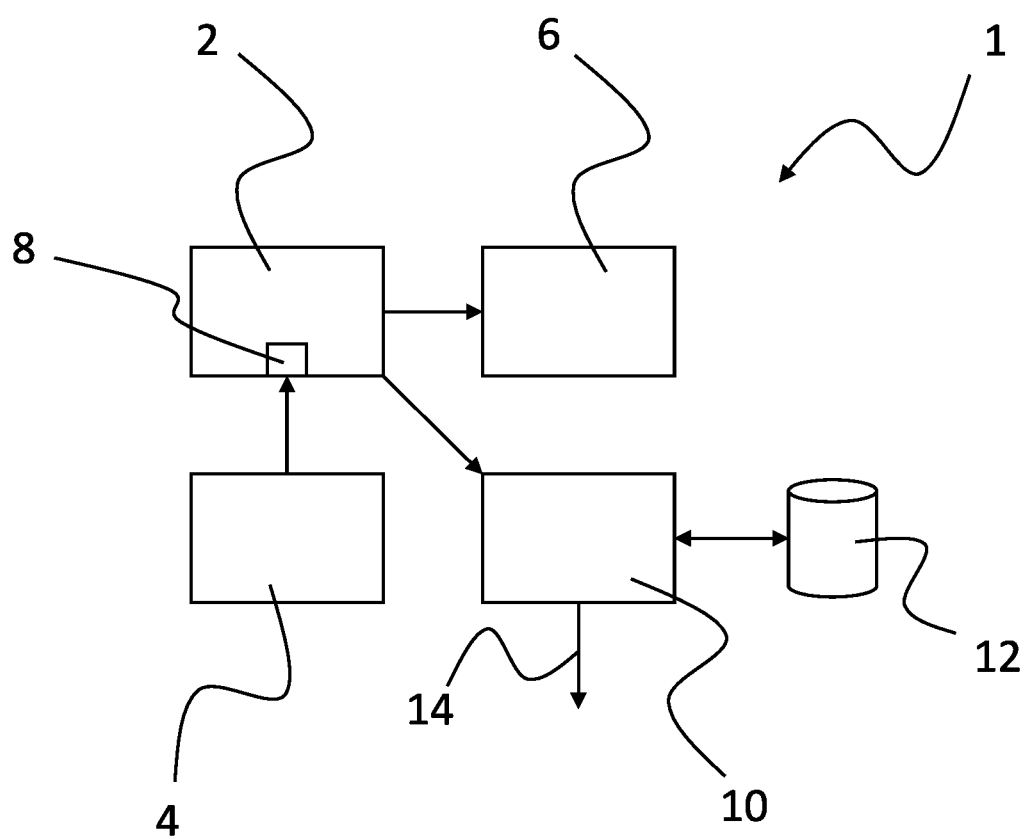
FIG. 1 shows a schematic block diagram of a general construction of a lubrication system.

FIG. 1 shows a lubrication system 1 that includes a progressive distributor 2. The progressive distributor 2 serves to dispense lubricant from a lubricant reservoir 4 via different metering pistons (not depicted in FIG. 1) to at least one consumer 6. The progressive distributor 2 serves to dispense a required amount of lubricant to the consumer 6. The progressive distributor 2 includes at least one sensor 8 that is configured to determine at least one lubricant pressure inside the lubrication system 1. The sensor 8 can be, for example, a pressure sensor. The sensor 8 can also be comprised of a plurality of sensors that can include, for example, a pressure sensor and a temperature sensor, or further sensors. Although only one sensor 8 is depicted here, which is preferably disposed at an inlet of the progressive distributor 2, it is also possible that the lubrication system 1 includes a plurality of sensors that are disposed at different points of the lubrication system 1. Depending on the number and position of the sensors, it is possible to determine further information about the lubrication system.

In order to be able to determine a state of the lubrication system 1, the lubrication system 1 includes a control device 10. The control device 10 is configured to receive measured values from the at least one sensor 8. The measured values can contain at least one pressure and one temperature of the lubrication system 1. The control device 10 is configured to detect lubrication cycles of the lubrication system 1 based on the measured values from the at least one sensor 8 and to determine the average pressure of a lubrication cycle, to compare the determined average pressure to a normal pressure of the lubrication system 1, and to determine the state of the lubrication system 1 based on the comparison result. This is explained in more detail below with reference to FIG. 2. The control device 10 can communicate with a database 12 in order to retrieve stored normal pressure values for the lubrication system 1.

The determined state can then be issued by the control device 10, for example, via an output 14. The issued state of the lubrication system 1 can be issued in the form of a visual indicator by colored output, e.g., by LEDs, as a detailed display on a screen or on a mobile device, or the like.

Figure 2:
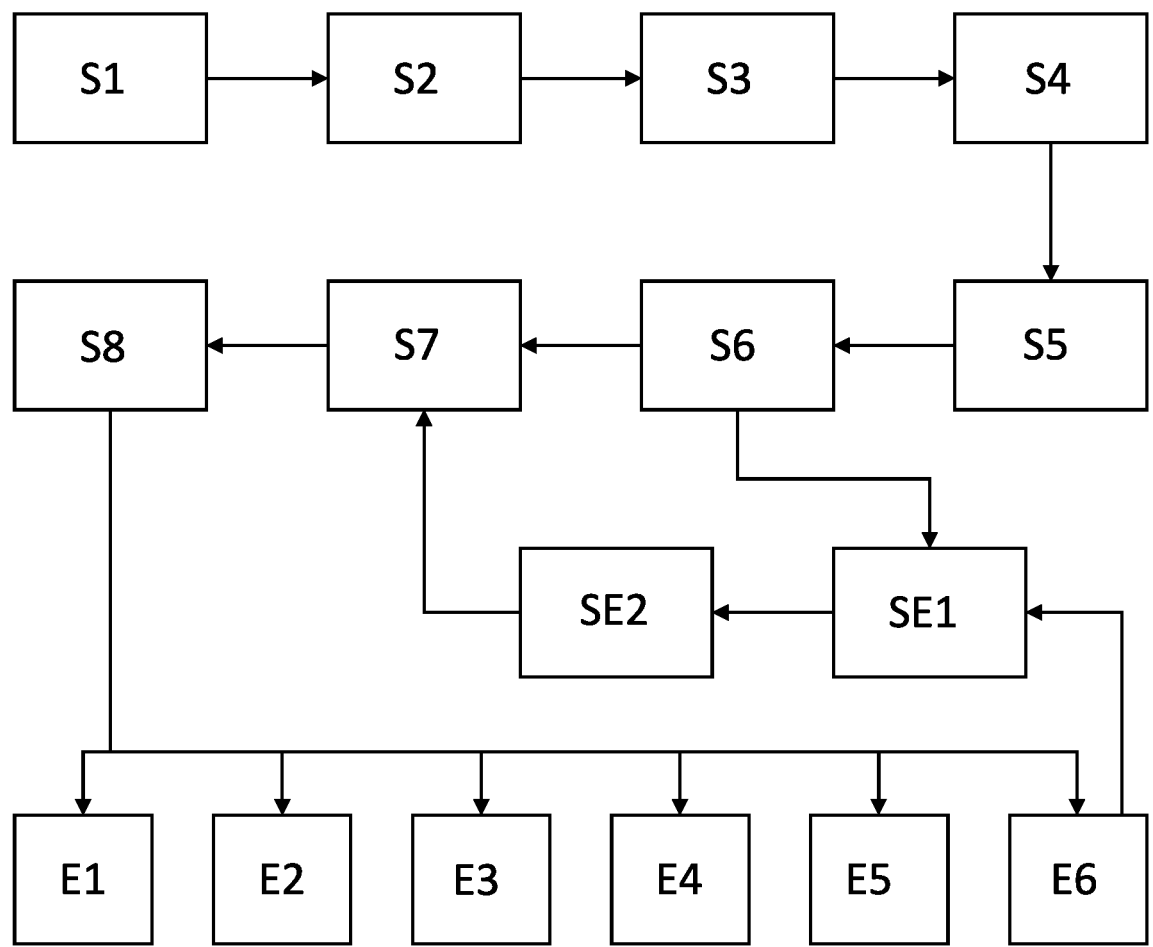
FIG. 2 shows a schematic flow diagram of a method for determining a state of a lubrication system.
Figure 3:
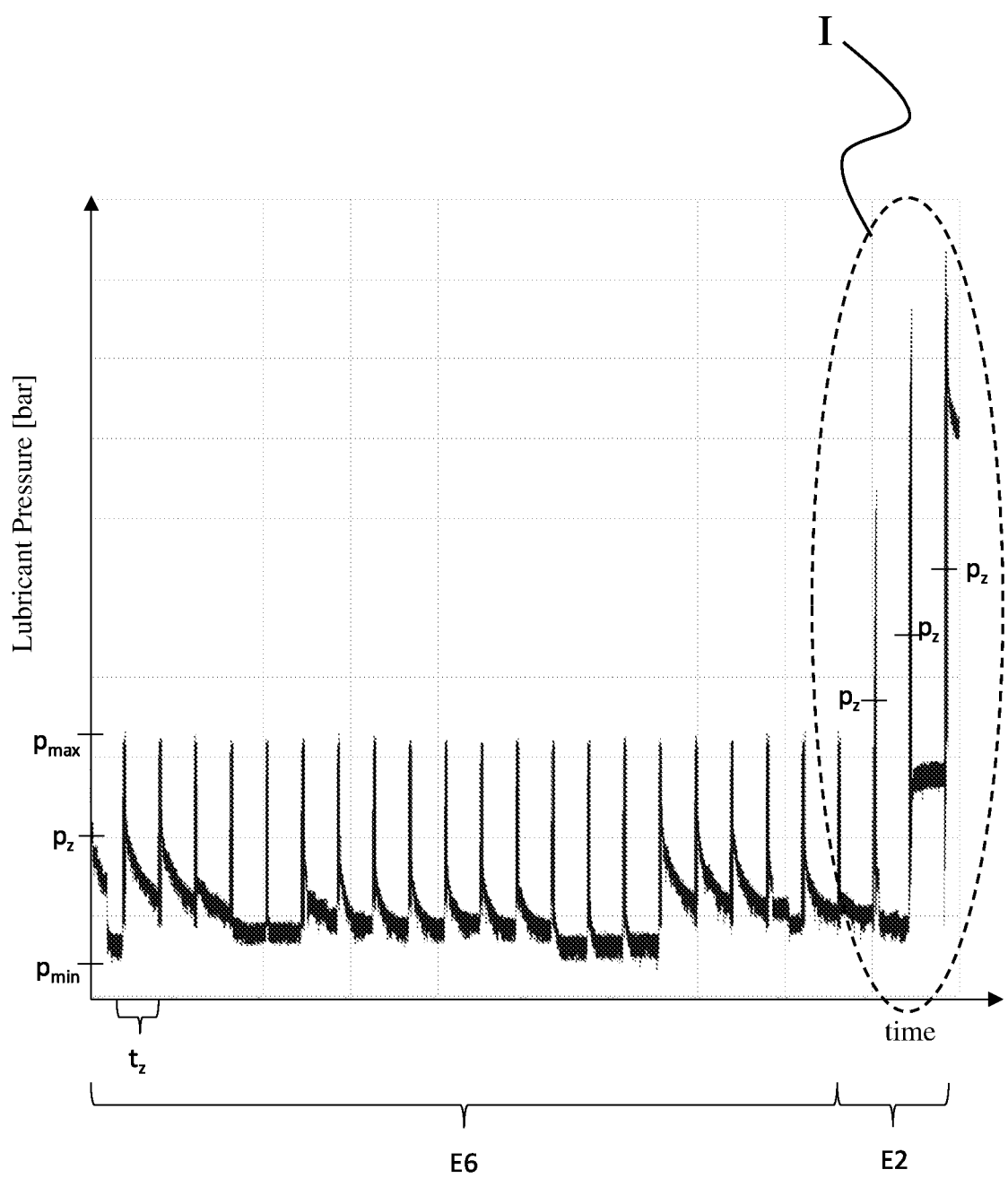
FIG. 3 shows a graph that represents the temporal course of a pressure level in the lubrication system of FIG. 1 including a blockage.
Figure 4:
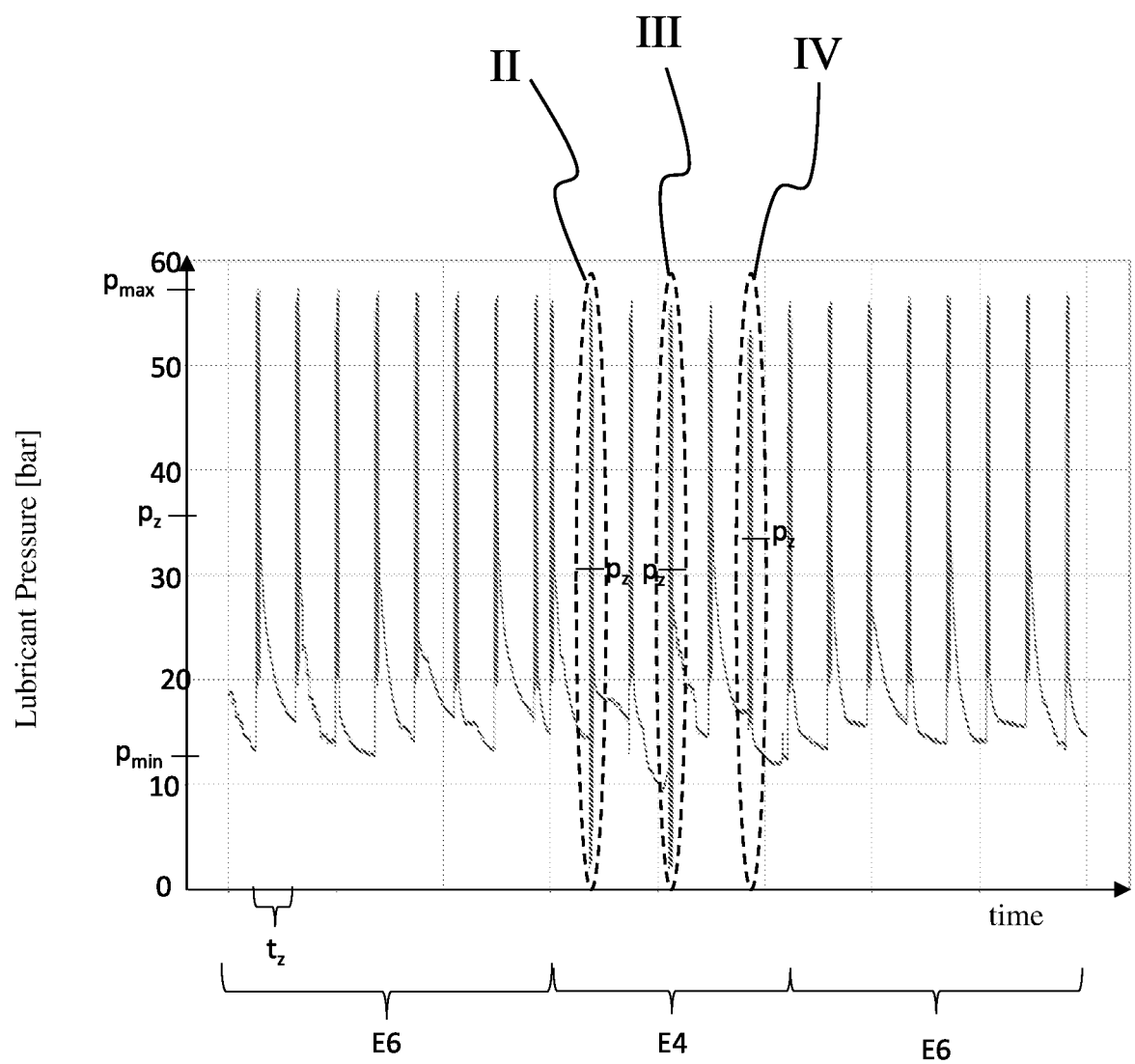
FIG. 4 shows a graph that represents the temporal course of a pressure level in the lubrication system of FIG. 1 including line breaks.

In the following an exemplary method is now described with reference to FIG. 2, which method is carried out by the control device 10 in order to determine a state of the lubrication system 1. In FIGS. 3 and 4, the associated signals are depicted by way of example.

In a first step S1, the measured values of the pressure sensor 8 are transmitted to the control device 10. It should be noted that in addition to the pressure sensor 8, further pressure sensors (not depicted) can be used in addition to the pressure sensor 8. Furthermore, a separate temperature sensor (not depicted) can be used in order to measure the temperature of the lubrication system 1.

The following method uses, by way of example, a pressure sensor 8 that is installed near the inlet of the progressive distributor 2 of the lubrication system 1, and monitors the pressure level in the lubricant line at this point. Due to the functioning of the progressive distributor 2, the pressure level at the inlet of the progressive distributor 2 is approximately the pressure level of a currently controlled outlet that supplies the consumer 6 with lubricant. This pressure level is dependent on the length of the downstream line, the subsequent component (further progressive distributor, lubrication point), the type of the lubrication point, the lubricant, the temperature of the lubricant, and other factors. Due to the continuous change of the controlled outlet, the pressure level changes continuously. The sequence by which the outlets of the progressive distributor 2 are controlled is always identical in a system-dependent manner. In this way a repeating pattern of the pressure level arises that is unique for each lubrication system. As can be seen in the following with reference to FIGS. 2 to 4, changes of the pattern allow conclusions about a change in the lubrication system and the type of change, for example, line break, impending blockage, etc.

The measured values of the sensor 8 are preferably present as signals that are temporally triggered. In particular, the measured values contain a pressure and a temperature of the lubrication system 1.

In step S2, the received measured values are stored as variables. For example, the variables can be stored in the form of an array wherein a plurality of values per time are present. Here the plurality of values contain at least the pressure and the temperature of the lubrication system 1 per time.

In step S3, the control device 10 then determines the start and end time points of the lubrication cycles ($t_z$) based on the measured values. A lubrication cycle ($t_z$) can be identified by associating pressure fluctuations that are detected in the measured values with a start and an end of a lubrication cycle.

If a lubrication cycle ($t_z$) has been recognized, in step S4 the control device 10 establishes an average pressure per lubrication cycle ($p_z$). Here the average pressure ($p_z$) is in particular an average value of all pressure values of a lubrication cycle ($t_z$).

In step S5, the control device 10 stores for the current lubrication cycle an average pressure of the lubrication cycle ($p_z$), a maximum pressure ($p_{max}$), and a minimum pressure ($p_{min}$) of the lubrication cycle ($t_z$), as well as a temperature of the lubrication cycle ($t_z$).

In step S6, the current average pressure ($p_z$) is subsequently associated with a temperature window (T). This occurs in a manner depending on the measured temperature of the current lubrication cycle. In order to associate the average pressure ($p_z$) with a temperature window (T), here the control device 10 can access a database 12 wherein already existing temperature windows are stored with associated normal pressure values ($p_{gT}$). If no normal pressure ($p_{gT}$) is present for the current temperature window (T), the control device enters a learning phase that is explained further below.

When a normal pressure ($p_{gT}$) is present for the current temperature window (T), in step S7 the control device compares the current average pressure ($p_z$) with the temperature-dependent normal pressure ($p_{gT}$) of the temperature window (T) that is stored in the database 12.

The control device 10 can subsequently classify the comparison result in step S8. Depending on how many measured values are present, the result can be coarse or fine. As a coarse classification the control device 10 can determine, for example, that the lubrication system 1 has no function (E1), that a malfunction is present (E2-E5), or that a fault-free operation is present (E6). If more precise data is available, the control device 10 can also determine a type of the malfunction (E2 to E5).

If no signal of the sensor 8 is present or no pressure changes are present in the measured values, the control device 10 determines that no function (E1) of the lubrication system 1 is present. This can be the case when there is a complete failure of the lubrication system 1 or when the sensors 8 have completely failed.

If a malfunction of the lubrication system 1 is recognized when sufficiently precise measured values are present, a subdivision into the following malfunctions can be effected:

A blockage of a lubricant line can be detected (E2) when three successive average pressure values ($p_z$) are higher by a factor k than the temperature-dependent normal pressure ($p_{gT}$), and the values continuously increase. Alternatively, a blockage can be assumed when a value of the average pressure ($p_z$) is at least 200% above the normal pressure ($p_{gT}$). A blockage is present, for example, when a lubricant line is blocked by foreign bodies or the like. In particular, this blockage can build up continuously, for example, by continuously reducing the through-flow through the lubricant line.

Such a blockage is depicted by way of example in FIG. 3, which shows a temporal course of the lubricant pressure that is measured by way of example by the pressure sensor 8. As can be seen, the pressure increases inside the region I. This indicates a blockage of the line in the lubrication system 1. In particular, it can be seen that the maximum value of the lubricant pressure increases the longer the blockage lasts.

If at least three successive average pressure values ($p_z$) are recognized higher by a factor k than the temperature-dependent normal pressure ($p_{gT}$), wherein the values increase non-continuously, this is defined as a kink in a line (E3).

If at least three successive values of the average pressure ($p_z$) are lower by a factor k than the temperature-dependent normal pressure ($p_{gT}$), with the values not dropping continuously, a line break is assumed (E4). Such a line break leads to a leakage of lubricant, whereby the pressure in the lubrication system 1 drops.

Such a line break is depicted in FIG. 4, which shows a temporal course of the lubricant pressure that can also be measured by way of example by the pressure sensor 8. Here a line break has been artificially generated in a test construction by lines being clamped off at different time points. The regions II, III and IV mark these time points that show different line breaks. As can be seen, a change can be inferred from the lubricant pressure course detected by the pressure sensor 8. With the pressure sensor 8 at the inlet of the progressive distributor 2, not only can a line break be determined at this progressive distributor 2, but also a line break at other points of the lubrication system 1. It is to be noted that each artificially generated line break has been corrected after one cycle, which is why in FIG. 4 no three successive values of the average pressure ($p_z$) are to be seen that are smaller by a factor k than the temperature-dependent normal pressure ($p_{gT}$).

If other deviations from the temperature-dependent normal pressure ($p_{gT}$) are present, under certain circumstances it cannot be determined which type of fault is present, but it is recognized that a fault of the lubrication system 1 is present (E5).

If the control device 10 recognizes a regular change between the lubrication cycles and the pause times without relevant deviations of the average pressure ($p_z$) from the temperature-dependent normal pressure ($p_{gT}$), a fault-free operation is present (E6). In this case, on the one hand the control device 10 can output that a fault-free operation of the lubrication system 1 is present, and on the other hand this information can be used to update the database 12. This means that the current values are used for the learning phase SE1 to SE2 in order to be able to provide more precise information for the further operation.

The current value of the average pressure ($p_z$) is therefore used (SE1) for the extension of the database 12 of the temperature-dependent normal pressure ($p_{gT}$) of the temperature window (T). If a value is already present for the current temperature window (T), the average pressure ($p_z$) is used to form (step SE2) a new temperature-dependent normal pressure value ($p_{gT}$). This is comprised of the average of all fault-free values ($p_z$) from a temperature window (T). In this way each time a fault-free operation (E6) is determined, the database 12 can be extended accordingly, and in this way the temperature-dependent normal pressure ($p_{gT}$) becomes more precise.

If it has been recognized in step S6 that there is still no normal pressure ($p_{gT}$) for the temperature window (T), in step SE1 the database 12 for the temperature window (T) is not updated, but rather extended. In this case the current measured and calculated average pressure ($p_z$) of the temperature window (T) is stored as temperature-dependent normal pressure ($p_{gT}$) for the temperature window (T). Since at the start of the operation of the lubrication system 1 it is assumed that a fault-free operation is present, this measured value can be viewed as normal pressure ($p_{gT}$).

In summary, due to the above-described lubrication system and control device, and the corresponding analysis method, it is possible to determine a state of the lubrication system in a simple manner. In particular, when a malfunction is present, it can be defined more precisely based on the existing measured values.

REFERENCE NUMBER LIST

1 Lubrication system
2 Progressive distributor
4 Reservoir
6 Consumer
10 Control device
12 Database
14 Output
E1-E6 Result
$p_z$ Average pressure
$p_{max}$ Maximum pressure
$p_{min}$ Minimum pressure
S1-S8 Method steps
SE1-SE2 Learning phase
$t_z$ Lubrication cycle
I-IV Signal regions

The invention claimed is:

1. A lubrication system comprising:
a progressive distributor configured to dispense lubricant to a consumer, the progressive distributor including at least one sensor, and
a control device,
wherein the at least one sensor is configured to determine at least one lubricant pressure inside the lubrication system,
wherein the control device is configured to receive measured values from the at least one sensor,
wherein the control device is configured to recognize a lubrication cycle based on the measured values and to determine an average pressure of the lubrication cycle, to perform a comparison of the average pressure and at least one normal pressure of the lubrication system, and to determine a state of the lubrication system based on a result of the comparison,
wherein the control device is configured to determine a maximum pressure, a minimum pressure, and a temperature of the lubrication system,
wherein the control device is configured to associate the average pressure with one of a plurality of temperature windows based on the temperature of the lubrication system, and
wherein the control device is configured to retrieve from a database the one of the at least one normal pressure that is associated with the one of the plurality of temperature windows.

2. The lubrication system according to claim 1, wherein the at least one sensor is configured to measure a temperature of the lubrication system, and wherein the measured values are at least one pressure and one temperature of the lubrication system.

3. The lubrication system according to claim 1, wherein the control device is configured to detect a lubrication cycle based on pressure fluctuations of the lubrication system.

4. The lubrication system according to claim 1, wherein the control device is configured to store the average pressure as a normal pressure for a given temperature window when no normal pressure for the given temperature window is present in the database.

5. The lubrication system according to claim 1, wherein the control device is configured to update the normal pressure for the given temperature window based on a current average pressure of the given temperature window when a fault-free operation of the lubrication system is recognized.

6. The lubrication system according to claim 1, wherein the state of the lubrication system is a fault-free operation of the lubrication system, a malfunction of the lubrication system, or no function of the lubrication system.

7. The lubrication system according to claim 6, wherein the malfunction of the lubrication system is a blockage of a lubricant line, a kink of a lubricant line, and/or a break of a lubricant line.

8. The lubrication system according to claim 1, wherein one of the at least one sensor is disposed upstream of the progressive distributor.

9. A control device for a lubrication system,
   wherein the lubrication system includes:
   a progressive distributor configured to dispense lubricant to a consumer,
   a pressure sensor configured to determine a lubricant pressure inside the lubrication system at a plurality of times and to produce a plurality of pressure signals each indicative of the lubricant pressure at one of the plurality of times, and
   a temperature sensor configured to determine a temperature of the lubricant in the lubrication system and to produce a temperature signal indicative of the temperature of the lubricant, and
   wherein the control device is configured to:
   receive the plurality of pressure signals and to recognize a lubrication cycle from the plurality of pressure signals and to determine an average pressure of the lubrication cycle,
   read from a database a normal pressure associated with each of a plurality of temperature windows,
   compare the average pressure of the lubrication cycle to the normal pressure of a temperature window selected based on the signal indicative of the temperature of the lubricant, and
   determine a state of the lubrication system based on a result of the comparing.

10. A lubrication system comprising:
    a progressive distributor configured to dispense lubricant to a consumer,
    a pressure sensor configured to determine a lubricant pressure inside the lubrication system at a plurality of times and to produce a plurality of pressure signals each indicative of the lubricant pressure at one of the plurality of times,
    a temperature sensor configured to determine a temperature of the lubricant in the lubrication system and to produce a temperature signal indicative of the temperature of the lubricant, and
    a control device according to claim 9.

11. A method for determining a state of a lubrication system including a progressive distributor that is configured to dispense lubricant to a consumer, the method comprising:
    determining a lubricant pressure inside the lubrication system at a plurality of times and producing a plurality of pressure signals each indicative of the lubricant pressure at one of the plurality of times,
    determining a temperature of the lubricant in the lubrication system and producing a temperature signal indicative of the temperature of the lubricant,
    recognizing a lubrication cycle from the plurality of pressure signals,
    determining an average pressure of the lubrication cycle,
    reading from a database containing a normal pressure associated with each of a plurality of temperature windows a normal pressure associated with the temperature indicated by the temperature signal,
    comparing the average pressure of the lubrication cycle to the normal pressure associated with the temperature indicated by the temperature signal, and
    determining a state of the lubrication system based on a result of the comparing.

* * * * *